United States Patent
Kudo et al.

(10) Patent No.: US 12,463,518 B2
(45) Date of Patent: Nov. 4, 2025

(54) SOLENOID ACTUATOR

(71) Applicant: MIKUNI CORPORATION, Tokyo (JP)

(72) Inventors: Takeshi Kudo, Takizawa (JP); Toshiki Ogasawara, Takizawa (JP)

(73) Assignee: MIKUNI CORPORATION, Tokyo (JP)

(*) Notice: Subject to any disclaimer, the term of this patent is extended or adjusted under 35 U.S.C. 154(b) by 209 days.

(21) Appl. No.: 18/467,870

(22) Filed: Sep. 15, 2023

(65) Prior Publication Data

US 2024/0204641 A1    Jun. 20, 2024

(30) Foreign Application Priority Data

Dec. 15, 2022  (JP) ................. 2022-200563

(51) Int. Cl.
*H02K 41/02* (2006.01)
*H02K 7/08* (2006.01)
*H02K 16/04* (2006.01)

(52) U.S. Cl.
CPC ........... *H02K 41/02* (2013.01); *H02K 7/08* (2013.01); *H02K 16/04* (2013.01)

(58) Field of Classification Search
CPC ........... H02K 41/02; H02K 7/08; H02K 16/04
USPC ..................... 310/12.12, 12.21, 14
See application file for complete search history.

(56) References Cited

U.S. PATENT DOCUMENTS 8,928,440 B2    1/2015  Matsumoto et al.
2014/0028423 A1  1/2014  Matsumoto et al.

FOREIGN PATENT DOCUMENTS

JP           5720638 B2    5/2015
WO   WO-2017169051 A1 * 10/2017 ............. F16D 1/116

* cited by examiner

*Primary Examiner* — Jose A Gonzalez Quinones
(74) *Attorney, Agent, or Firm* — ROSSI, KIMMS & McDOWELL LLP

(57) ABSTRACT

A solenoid actuator 1 includes: a coil 3; a first stator 10 and a second stator 20 disposed with an air gap 11 therebetween in an axial direction so as to form a magnetic path 4 around the coil 3; and a mover 50 configured to be movable in the axial direction to a maximum stroke position (X=Xmax) from an original position (X=0) on a radially inner side of the first stator 10 toward the second stator 20 by a magnetic force generated by energizing the coil 3. The mover 50 has an annular projection 100 projecting in the axial direction from a peripheral edge portion of the mover 50. The second stator 20 includes: a second yoke 24; and a second press part 40 made of a magnetic material and disposed on an inner peripheral side of the second yoke 24 so as to at least partially form an annular recess 120 for receiving the annular projection 100 of the mover 50 at the maximum stroke position (X=Xmax).

8 Claims, 15 Drawing Sheets

SOLENOID ACTUATOR

TECHNICAL FIELD

The present disclosure relates to a solenoid actuator.

BACKGROUND

Conventionally, a solenoid actuator has been known in which a stator for forming a magnetic path around a coil is disposed and a mover can be moved in the axial direction by attracting the mover with a magnetic force generated by energizing the coil.

For example, Patent Document 1 describes a linear solenoid that includes a first stator core disposed on a maximum stroke position side of a mover core and a second stator core disposed on a stroke start position (original position) side of the mover core.

The linear solenoid described in Patent Document 1 has a configuration in which a hole (recess) is provided in a bottom of a yoke located on the original position side of the mover core and a portion of the second stator core is fitted into this hole (recess). The axial length of a magnetic transmission part of the mover core is lengthened by fitting the second stator core into the hole (recess) in the bottom of the yoke. Whereby, it is possible to sufficiently ensure the amount of axial overlap between the mover core and the magnetic transmission part even in the latter half of the stroke of the mover core from the second stator core toward the first stator core. As a result, in the vicinity of the maximum stroke position of the mover core, an increase in magnetic flux density transmitted between the mover core and the magnetic transmission part is suppressed and a rapid increase in magnetic attractive force to pull the mover core backward (second stator core side) in the axial direction is prevented.

CITATION LIST

Patent Literature

Patent Document 1: JP5720638B

SUMMARY

Meanwhile, the cause of a decrease in thrust of the solenoid actuator in the latter half of the stroke of the mover core is not limited to the rapid increase in magnetic attractive force to pull the mover core backward as described in Patent Document 1, but there are also other causes.

For example, depending on the shapes of the mover and the stator, the ratio of an axial component and a radial component of a magnetic force acting between the mover and the stator changes toward the maximum stroke position, and the thrust applied to the mover in the latter half of the stroke may be decreased.

Although it is possible to adjust the direction of the magnetic force, which acts between the mover and stator in the latter half of the stroke, by changing the shapes of the mover and the stator, a manufacturing cost of the solenoid actuator increases due to the complication of the shapes of the mover and the stator.

In view of the above, an object of at least some embodiments of the present invention is to provide a solenoid actuator capable of achieving both the reduction in manufacturing cost and the suppression of the decrease in thrust in the latter half of the stroke.

A solenoid actuator according to some embodiments, includes: a coil; a first stator and a second stator disposed with an air gap therebetween in an axial direction so as to form a magnetic path around the coil; and a mover configured to be movable in the axial direction to a maximum stroke position from an original position on a radially inner side of the first stator toward the second stator by a magnetic force generated by energizing the coil. The mover has an annular projection projecting in the axial direction from a peripheral edge portion of the mover. The second stator includes: a second yoke; and a second press part made of a magnetic material and disposed on an inner peripheral side of the second yoke so as to at least partially form an annular recess for receiving the annular projection of the mover at the maximum stroke position.

According to at least some embodiments of the present invention, a magnetism transfer area between the mover and the second stator increases in the vicinity of the maximum stroke position, making it possible to suppress a decrease in thrust applied to the mover. As a result, it is possible to realize a flat attraction characteristic with small fluctuations in thrust over the entire stroke range.

Further, since the annular recess of the second stator is at least partially formed by the second press part, a manufacturing cost can be reduced as compared with a case where the second stator with the annular recess is formed by a one-piece machined product.

DETAILED DESCRIPTION

Figure 1:
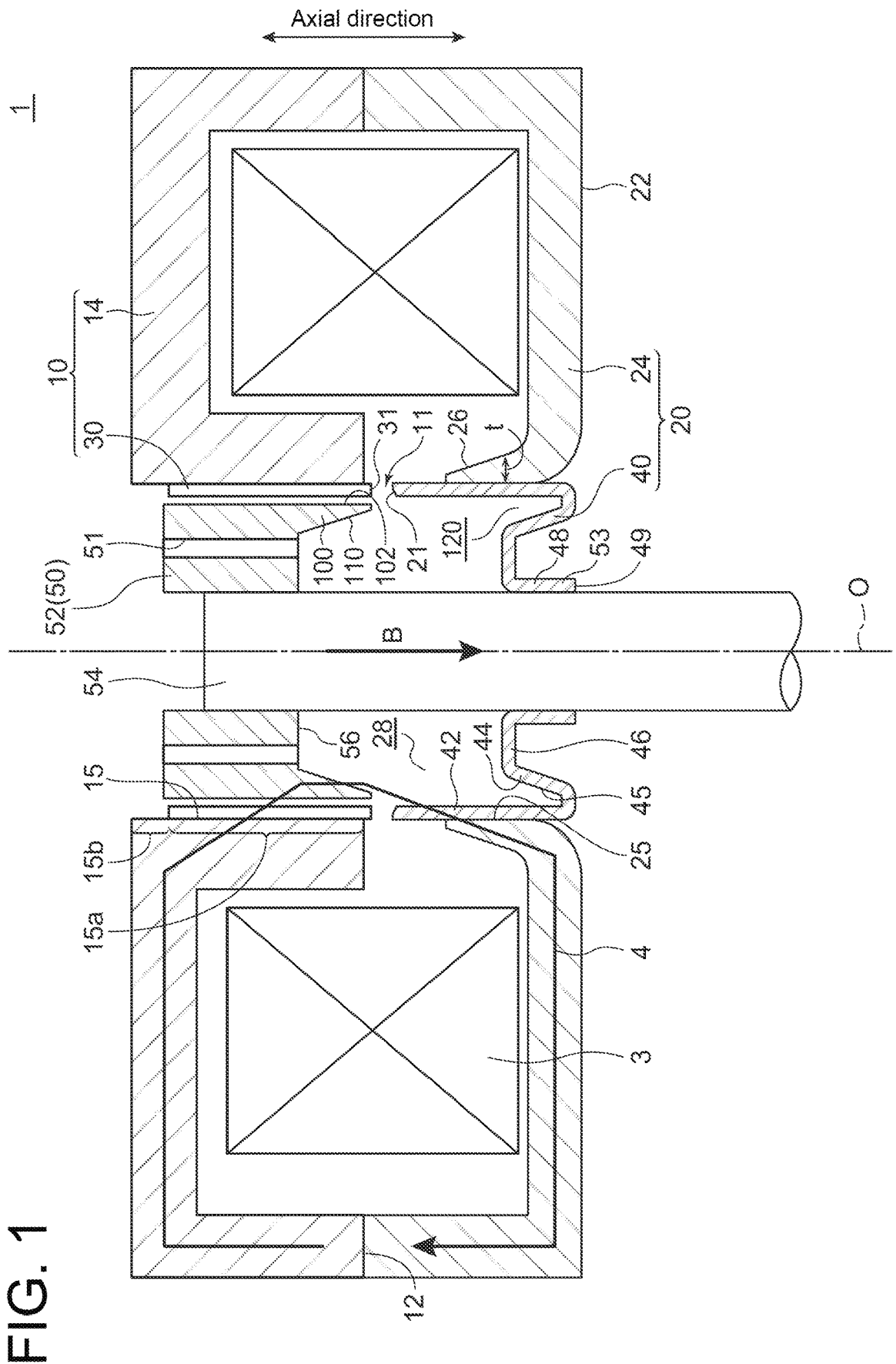
FIG. 1 is a cross-sectional view schematically showing the configuration of a solenoid actuator according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a cross-sectional view schematically showing the configuration of a solenoid actuator according to an embodiment.

Figure 2:
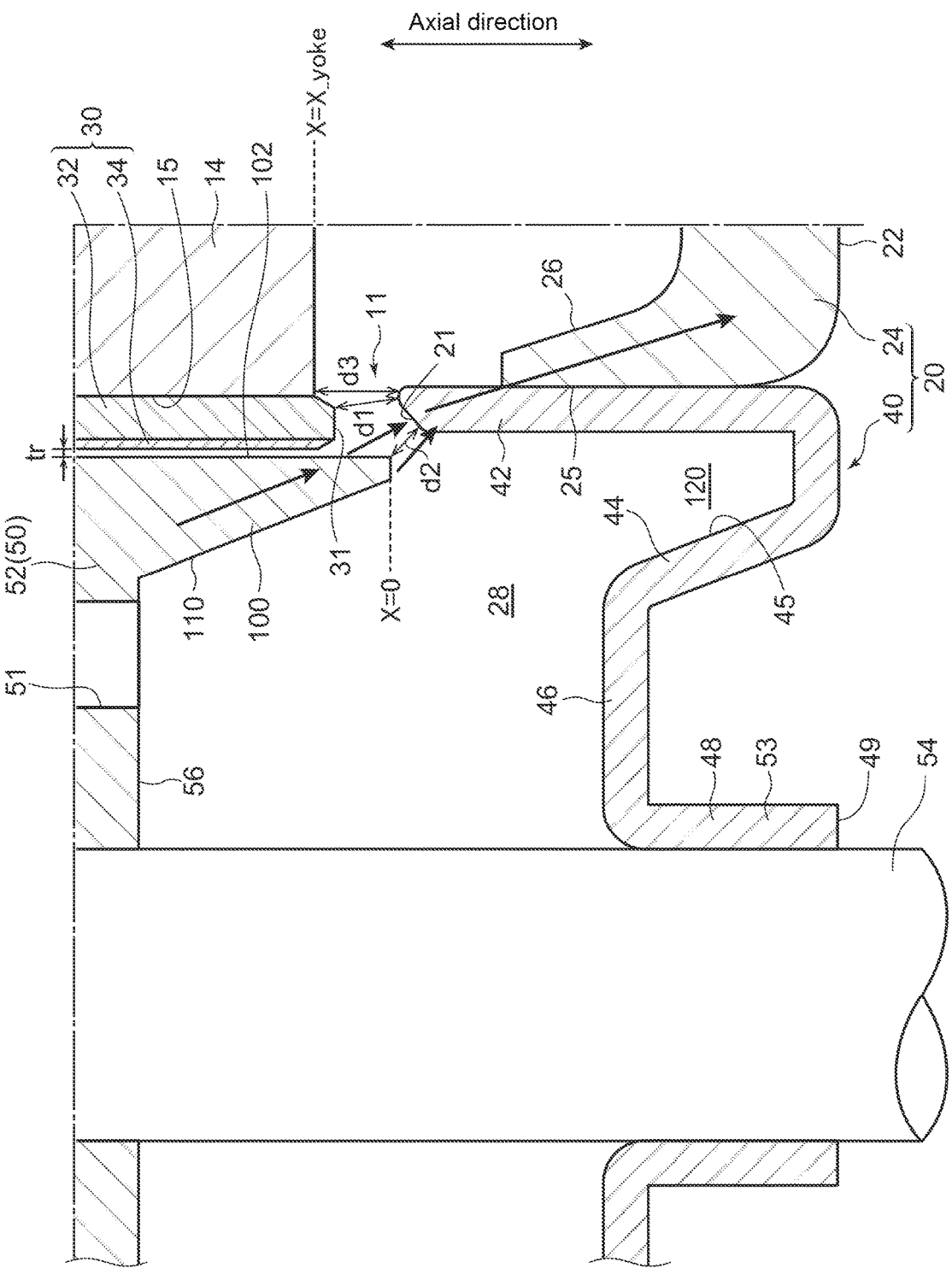
FIG. 2 is a partial cross-sectional view of the solenoid actuator according to an embodiment, and shows a magnetic flux transfer region between a mover and a second stator in a state where the mover is at an original position.
Figure 3:
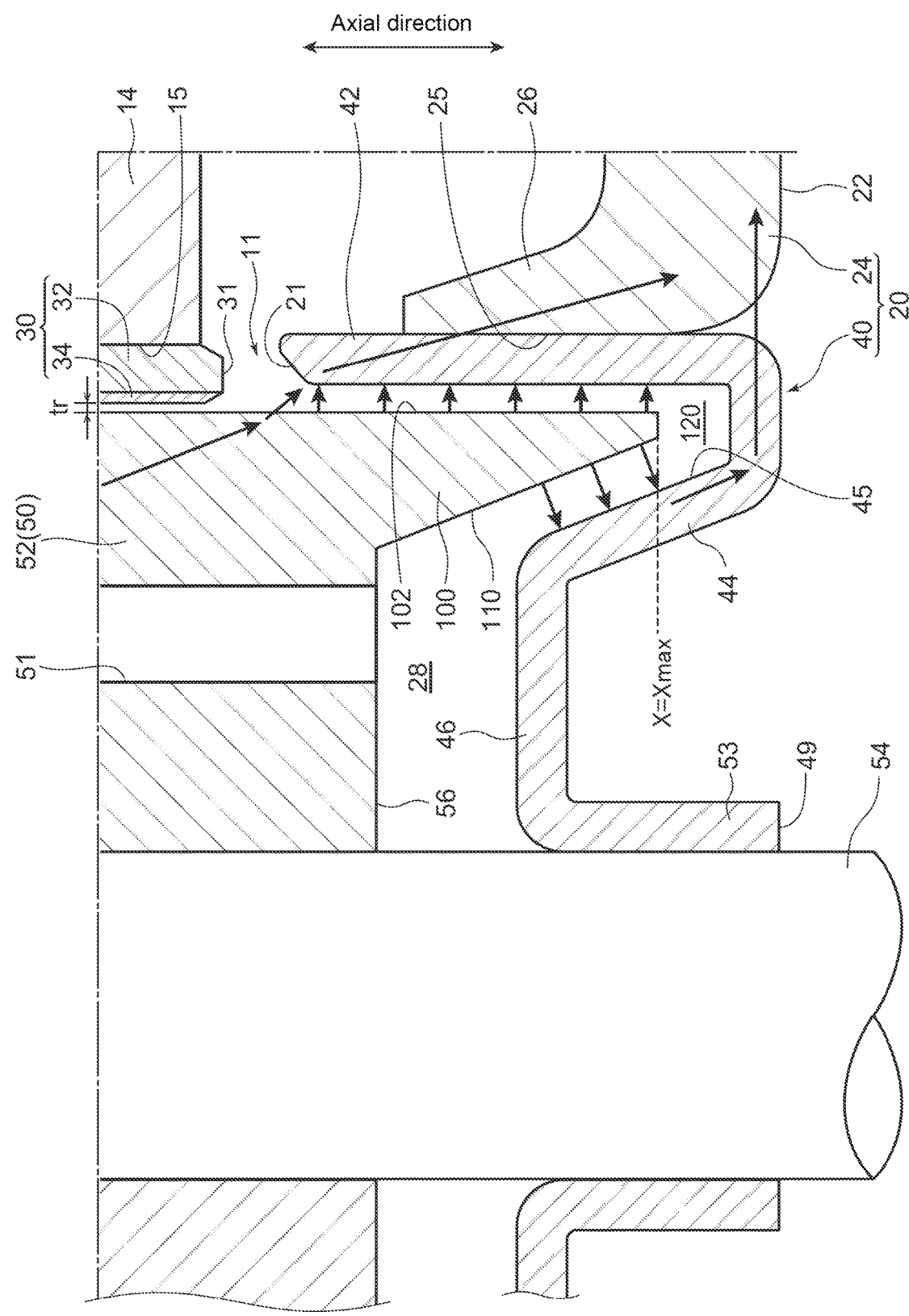
FIG. 3 is a partial cross-sectional view of the solenoid actuator according to an embodiment, and shows a magnetic flux transfer region between the mover and the second stator in a state where the mover is at a maximum stroke position.
Figure 4:
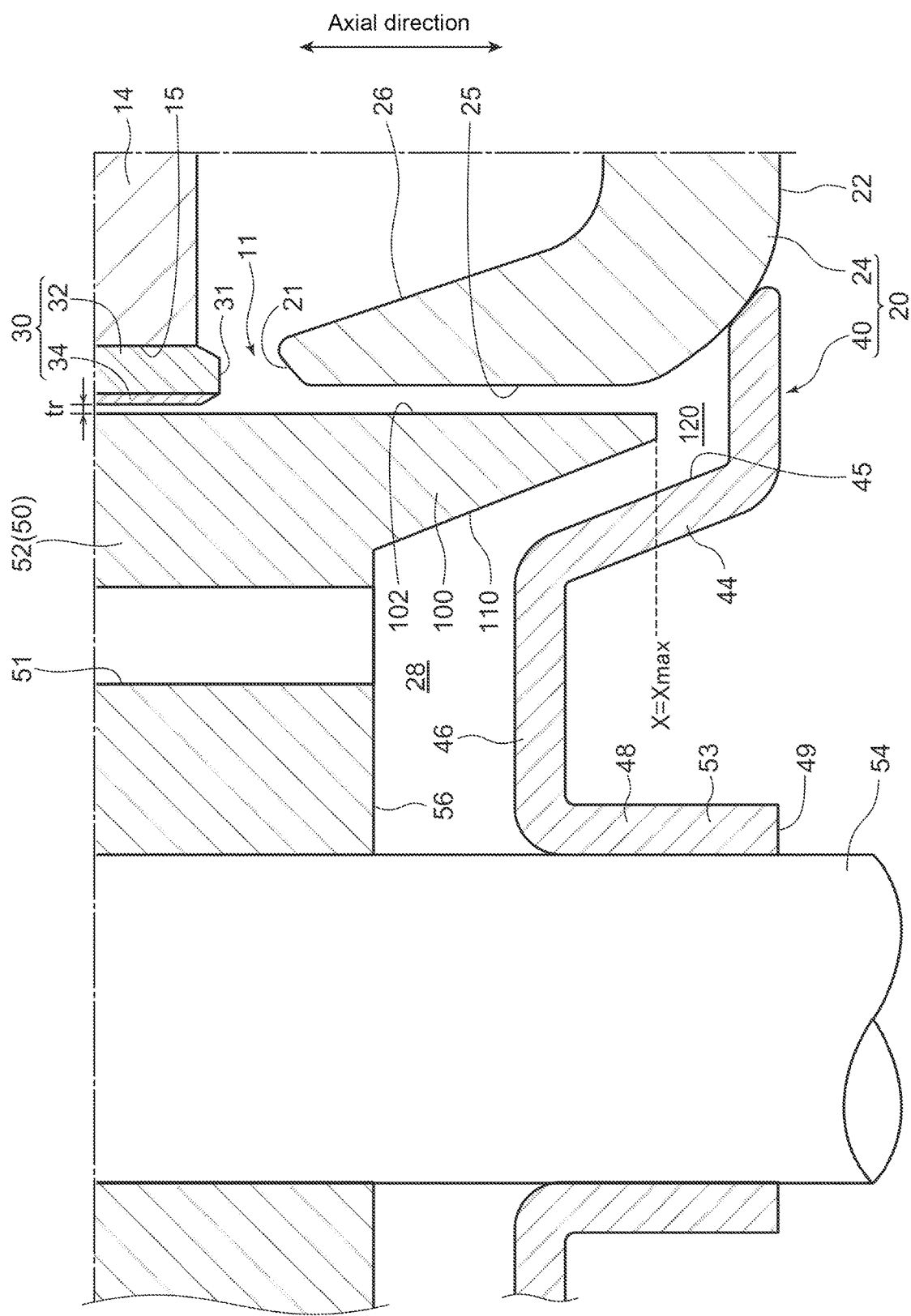
FIG. 4 is a partial cross-sectional view of the solenoid actuator according to another embodiment, and shows a magnetic flux transfer region between the mover and the second stator in the state where the mover is at the maximum stroke position.
Figure 5:
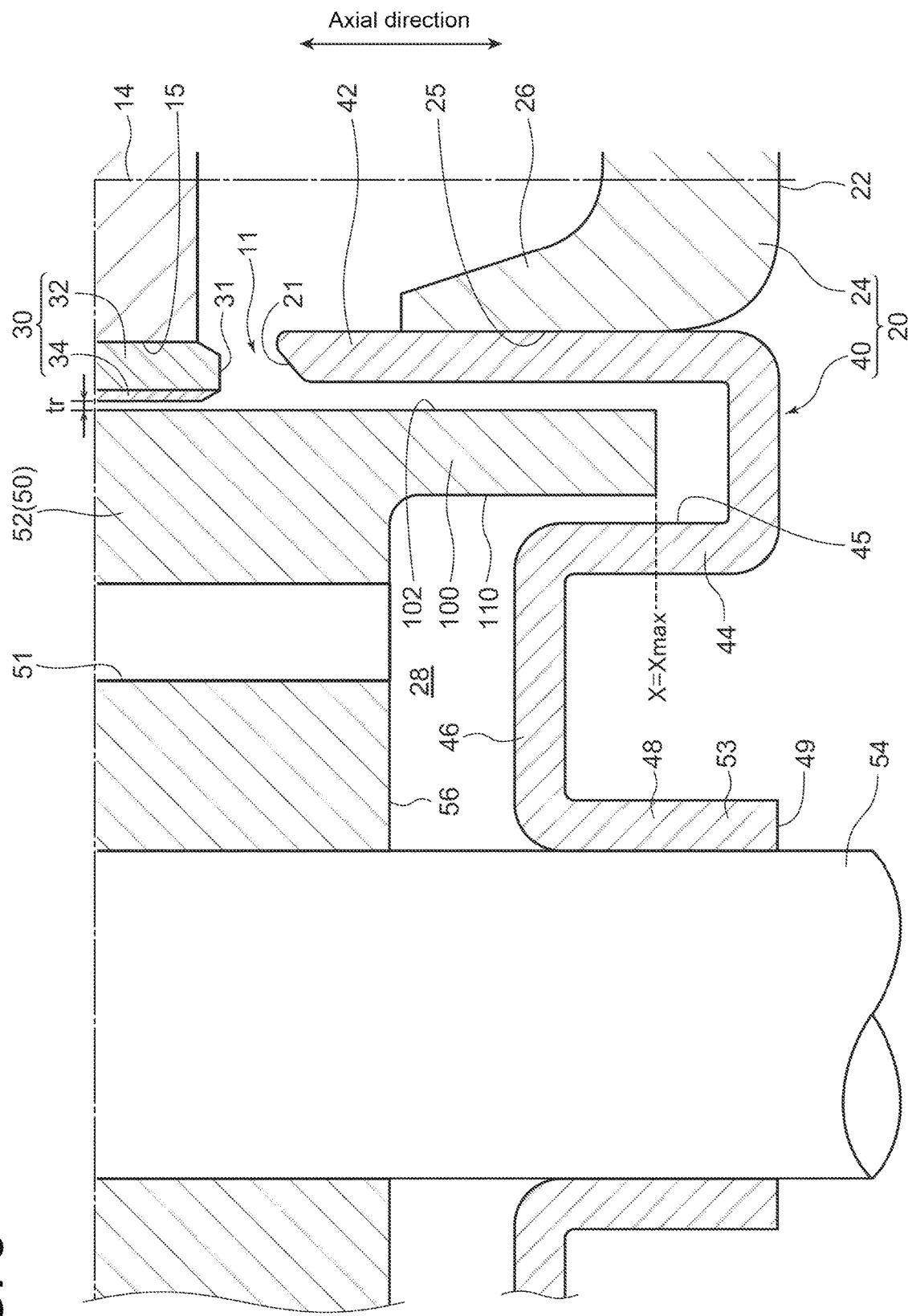
FIG. 5 is a partial cross-sectional view of the solenoid actuator according to still another embodiment, and shows a magnetic flux transfer region between the mover and the second stator in the state where the mover is at the maximum stroke position.

FIG. 2 is a partial cross-sectional view of the solenoid actuator according to an embodiment, and shows a magnetic flux transfer region between a mover and a second stator in a state where the mover is at an original position. FIG. 3 is a partial cross-sectional view of the solenoid actuator according to an embodiment, and shows a magnetic flux transfer region between the mover and the second stator in a state where the mover is at a maximum stroke position. FIG. 4 is a partial cross-sectional view of the solenoid actuator according to another embodiment, and shows a magnetic flux transfer region between the mover and the second stator in the state where the mover is at the maximum stroke position. FIG. 5 is a partial cross-sectional view of the solenoid actuator according to still another embodiment, and shows a magnetic flux transfer region between the mover and the second stator in the state where the mover is at the maximum stroke position.

The mover is axially movable in the range of $0 \leq X \leq Xmax$. FIGS. 2 to 5 show the position of the mover with reference to an axial position of a distal end of the mover (a distal end of an annular projection 100 described later). A distal end position X of the mover satisfies X=0 when the distal end of the mover is at the original position as shown in FIG. 2. The distal end position X of the mover satisfies X=Xmax when the distal end of the mover is at the maximum stroke position as shown in FIGS. 3 to 5. FIGS. 2 and 3 schematically show, by arrows, a magnetic flux distribution generated between the mover and the second stator.

Figure 6A:
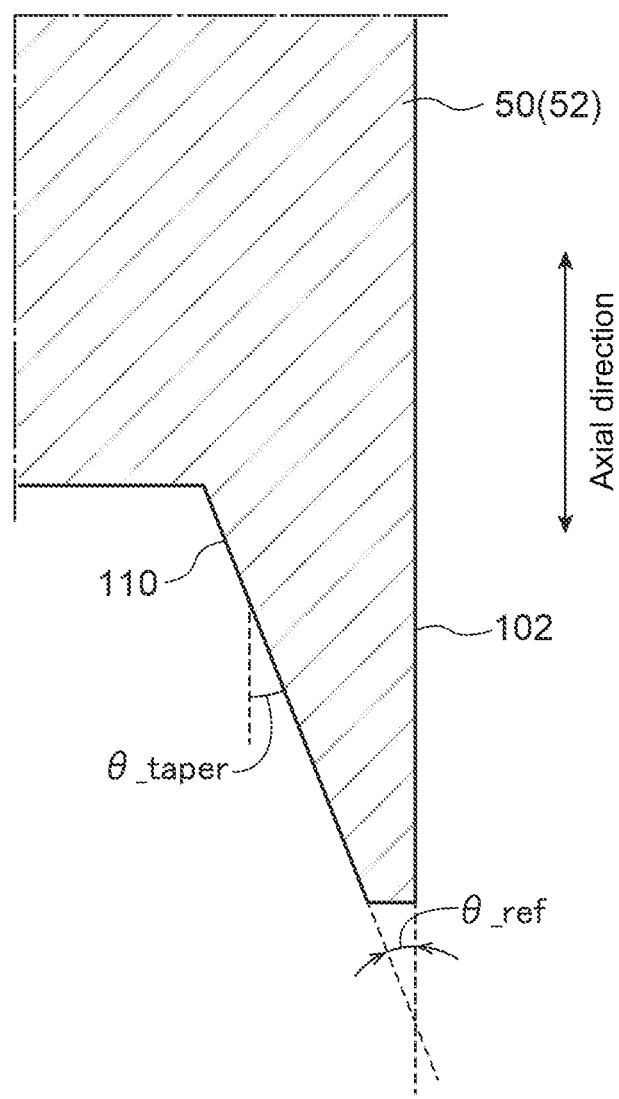
FIG. 6A is a partial cross-sectional view schematically showing an annular projection of the mover according to an embodiment.
Figure 6B:
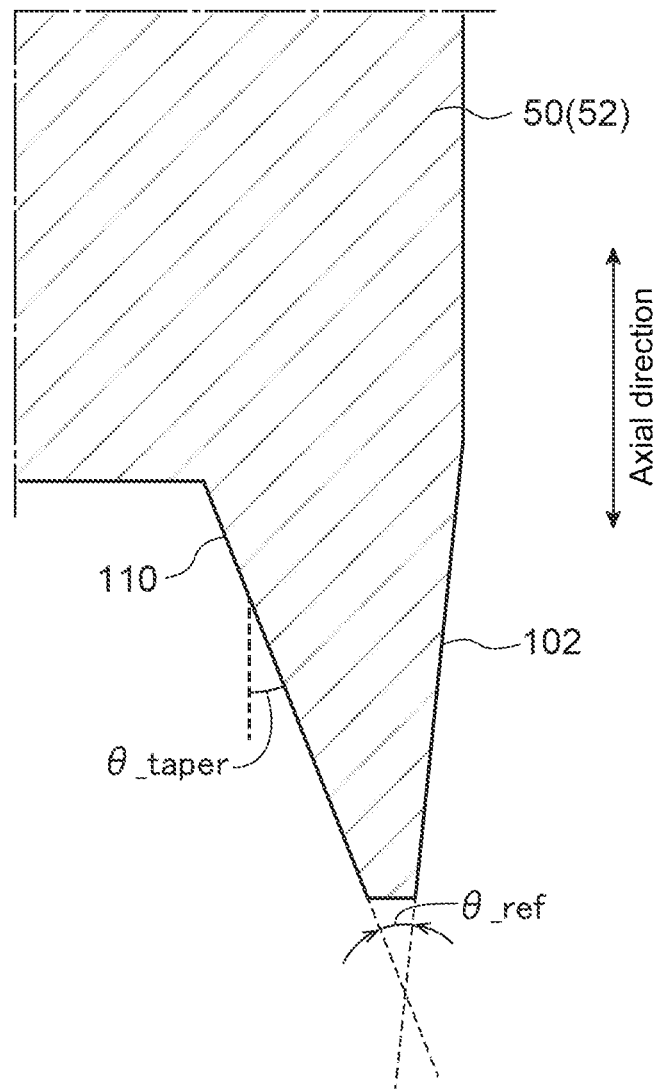
FIG. 6B is a partial cross-sectional view schematically showing the annular projection of the mover according to another embodiment.

FIG. 6A is a partial cross-sectional view schematically showing the annular projection of the mover according to an embodiment. FIG. 6B is a partial cross-sectional view schematically showing the annular projection of the mover according to another embodiment.

FIG. 1 omits illustration of a resin mold of the solenoid actuator. Further, a magnetic path 4 is shown only for one side of a coil 3 (a left-hand area in the figure), but the same magnetic path 4 is formed on either side (a right-hand area in the figure) of the annularly disposed coil 3 as well.

In some embodiments, as shown in FIG. 1, a solenoid actuator 1 includes the coil 3, a stator 10, 20 for forming the magnetic path 4 around the coil 3, and a mover 50 axially movable by a magnetic force generated by the coil 3.

The coil 3 is formed by winding a wire formed by a conductor such as copper or copper alloy around a central axis O of the solenoid actuator 1. The coil 3 has a substantially annular shape centering on the central axis O as a whole. The coil 3 is electrically connected to a terminal (not shown), and power is supplied to the coil 3 via the terminal. When the coil 3 is energized, a magnetic force for attracting the mover 50 is generated.

The coil 3 may be housed in a bobbin (not shown).

The stator 10, 20 includes the first stator 10 and the second stator 20 located on both sides of the coil 3 in the axial direction of the solenoid actuator 1. The stator 10, 20 is made of a magnetic material that may be, for example, iron and is disposed annularly around the central axis O so as to surround the coil 3.

The first stator 10 and the second stator 20 are arranged to face each other with an air gap 11 therebetween in the axial direction, on an inner peripheral side of the coil 3 and an outer peripheral side of the mover 50 described later.

The air gap 11 is provided to restrict a magnetic flux flow from the first stator 10 directly toward the second stator 20 without via the mover 50, and to efficiently flow a magnetic flux from the first stator 10 toward the second stator 20 via the mover 50.

In the example shown in FIG. 1, the first stator 10 and the second stator 20 are in contact with each other at a contact section 12 located on an outer peripheral side of the coil 3. In this case, the first stator 10 and the second stator 20 may integrally be molded by the resin mold (not shown) in a state where the first stator 10 and the second stator 20 face each other via the air gap 11 on the inner peripheral side of the coil 3 and are in contact with each other at the contact section 12 on the outer peripheral side of the coil 3.

The position of the contact section 12 between the first stator 10 and the second stator 20 is not particularly limited, but the contact section 12 may be located at a central position of the coil 3 in the axial direction as in the example of FIG. 1, or the contact section 12 may exist at a position different from the central position of the coil 3.

In another embodiment, the solenoid actuator 1 does not have a section where the first stator 10 and the second stator 20 contact each other.

For example, if the solenoid actuator 1 includes at least one stator other than the first stator 10 and the second stator 20, the at least one stator may be located between the first stator 10 and the second stator 20, and may form the magnetic path 4 together with the first stator 10 and the second stator 20. The another stator is thus interposed between the first stator 10 and the second stator 20, which may obtain the configuration where the first stator 10 and the second stator 20 do not directly contact each other.

Further, voids may exist between the plurality of stators including the first stator 10 and the second stator 20.

In some embodiments, the mover 50 includes a plunger 52. The plunger 52 is connected to a shaft 54 as an output shaft of the solenoid actuator 1. In the example shown in FIG. 1, the mover 50 includes the plunger 52 and the shaft 54 having a smaller outer diameter than the plunger 52.

In the embodiment shown in FIG. 1, the plunger 52 has a through hole into which the shaft 54 is press-fitted. The shaft 54 is press-fitted into the through hole of the plunger 52 such that the axis of the shaft 54 and the axis of the plunger 52 are aligned.

The plunger 52 as the mover 50 is formed by a magnetic material that may be, for example, iron and is mounted on an outer peripheral side of the shaft 54.

The plunger 52 has a diameter which is larger than a diameter of the shaft 54 and is smaller than an inner diameter of a cylindrical guide 30 of the first stator 10, which will be described later. Further, the diameter of the plunger 52 is smaller than a diameter of a boundary on an outer peripheral side of an annular recess 120 formed by the second stator 20, which will be described later.

When the coil 3 is in the non-excited state, the shaft 54 is biased by a spring (not shown) in a direction opposite to an arrow B, and the plunger 52 as the mover 50 is located radially inward of the first stator 10 (cylindrical guide 30). At this time, it is only necessary that the plunger 52 is substantially located radially inward of the cylindrical guide 30, and the end portion of the plunger 52 may project from the first stator 10 (cylindrical guide 30) toward the second stator 20.

Meanwhile, when the coil 3 is energized, the plunger 52 as the mover 50 is attracted in the direction of the arrow B and starts entering a cavity 28 formed by the second stator 20. At this time, it is only necessary that at least a portion of the plunger 52 is located in the cavity 28 of the second stator 20, and a remaining portion of the plunger 52 may project from the cavity 28 toward the first stator 10.

The shaft 54 to which the plunger 52 having the above configuration is fixed penetrates the second stator 20 and extends to the outside of the solenoid actuator 1. The shaft 54 is moved in the direction of the arrow B by the actuation of the solenoid actuator 1, and transmits a driving force of the solenoid actuator 1 to an external device (not shown).

The external device driven by the solenoid actuator 1 is not particularly limited, but may be, for example, a spool for hydraulically controlling a valve timing of an intake valve or an exhaust valve of a vehicle engine.

The shaft 54 may slidably be supported on the second stator 20 side by a bearing.

In the embodiment shown in FIG. 1, a radially inner section (inner cylinder section 48 described later) of a second press part 40 forming a portion of the second stator 20 functions as a bearing section 53, and the shaft 54 is slidably supported by the bearing section 53 of the second press part 40.

The plunger 52 may have at least one communication hole 51 axially penetrating the plunger 52. In the example shown in FIG. 1, two communication holes 51 are respectively disposed at circumferential positions opposite to each other across the shaft 54. Each communication hole 51 opens on an axial end surface 56 of the mover 50 facing the second stator 20.

Each communication hole 51 causes spaces on axial both sides of the plunger 52 to communicate with each other, and maintains the spaces on the axial both sides of the plunger 52 at substantially the same pressure. Therefore, the axial movement of the plunger 52 is not hindered.

In some embodiments, as shown in FIGS. 1 to 5, the mover 50 (plunger 52) has an annular projection 100 axially projecting toward the second stator 20 from a peripheral edge portion of the mover 50. The annular projection 100 is disposed continuously in the circumferential direction and projects toward the second stator 20 from a peripheral edge portion on the axial end surface 56 of the mover 50 facing the second stator 20.

As shown in FIGS. 3 to 5, the annular projection 100 enters the annular recess 120 of the second stator 20, which will be described later, when the mover 50 reaches the maximum stroke position (X=Xmax). As a result of the entry of the annular projection 100 into the annular recess 120, the mover 50 is attracted toward the second stator 20 from before the maximum stroke position by a magnetic flux generated between the annular projection 100 and the annular recess 120 (see FIG. 3). Therefore, the thrust of the solenoid actuator 1 can be maintained even near the maximum stroke position of the mover 50.

In the exemplary embodiment shown in FIG. 1, the annular projection 100 is disposed radially outward of each communication hole 51.

In the embodiments shown in FIGS. 1 to 4, the annular projection 100 has an outer peripheral surface 102 facing the stator 10, 20 in the radial direction, and a tapered inner peripheral surface 110 increasing in diameter toward the distal end of the annular projection 100. That is, the inner peripheral surface 110 of the annular projection 100 extends obliquely with respect to the axial direction from a base of the annular projection 100 on a radially outer side of the communication hole 51 toward the distal end of the annular projection 100.

In the exemplary embodiments shown in FIGS. 1 to 4, the tapered inner peripheral surface 110 of the annular projection 100 is formed by a linear contour extending from the base of the annular projection 100 toward the distal end of the annular projection 100. In another embodiment, the tapered inner peripheral surface 110 of the annular projection 100 is formed by a contour including a curve.

In some embodiments, the relation of θ_taper≥0.75×θ_ref is satisfied, where θ_ref is an angle formed by the inner peripheral surface 110 of the annular projection 100 with respect to the outer peripheral surface 102 of the annular projection 100 and θ_taper is an angle formed by the inner peripheral surface 110 of the annular projection 100 with respect to the axial direction, as shown in FIGS. 6A and 6B.

In the exemplary embodiment shown in FIG. 6A, the outer peripheral surface 102 of the annular projection 100 is parallel to the axial direction, and the angle θ_taper and the angle θ_ref coincide with each other. On the other hand, in the exemplary embodiment shown in FIG. 6B, the outer peripheral surface 102 decreases in diameter toward the distal end of the annular projection 100, and the angle θ_ref is greater than the angle θ_taper.

As shown in FIGS. 1 and 2, the mover 50 (plunger 52) is substantially surrounded by the first stator 10 at the original position.

In some embodiments, as shown in FIGS. 1 to 5, the first stator 10 surrounding the mover 50 at the original position includes a first yoke 14 and the cylindrical guide 30 fixed to an inner peripheral side of the first yoke 14. In another embodiment, the entire first stator 10 is formed as one piece.

The cylindrical guide 30 fixed to the inner peripheral side of the first yoke 14 axially faces the second stator 20 with the air gap 11 therebetween which is formed between the first stator 10 and the second stator 20. That is, a distal end 31 of the cylindrical guide 30 is not in contact with a distal end portion 21 of the second stator 20, but is separated by the air gap 11.

Herein, the air gap 11 means a minimum gap on the inner peripheral side of the coil 3, and between the second stator 20 and the first stator 10 including the first yoke 14 and the cylindrical guide 30.

The cylindrical guide 30 may be disposed such that the distal end 31 of the cylindrical guide 30 is located in a radial position range at least partially overlapping the distal end portion 21 of the second stator 20.

In some embodiments, as shown in FIGS. 1 to 5, the cylindrical guide 30 is disposed such that the distal end 31 projects from the first yoke 14 toward the second stator 20. That is, the cylindrical guide 30 axially extends toward the second stator 20 beyond a distal end position of the first yoke 14.

By thus extending the cylindrical guide 30 toward the second stator 20 beyond the distal end position of the first yoke 14, it becomes easier to secure a magnetism transfer area between the mover 50 and the cylindrical guide 30 (a magnetic tube 32 described later), and it is possible to increase a magnetic flux flowing between the second stator 20 and the mover 50 at the original position.

In the embodiments shown in FIGS. 2 to 5, the cylindrical guide 30 includes the magnetic tube 32 with an outer peripheral surface contacting an inner wall of a first through hole 15 of the first yoke 14, and a non-magnetic layer 34 formed on an inner peripheral surface of the magnetic tube 32.

The magnetic tube 32 is made of a magnetic material that may be, for example, iron, and the magnetic tube 32 faces the second stator 20 with the air gap 11 therebetween. That is, the magnetic tube 32 of the magnetic portion of the first stator 10 including the first yoke 14 and the cylindrical guide 30 is disposed closest to the distal end portion 21 of the second stator 20.

A radial position range of the magnetic tube 32 may at least partially overlap the radial position range of the distal end portion 21 of the second stator 20 that forms the air gap 11 with the magnetic tube 32.

The non-magnetic layer 34 of the cylindrical guide 30 is disposed on the inner peripheral surface of the magnetic tube 32 so as to face the outer peripheral surface of the mover 50.

Whereby, the cylindrical guide 30 can axially guide the mover 50 by bringing the mover 50 into sliding contact with the non-magnetic layer 34.

The non-magnetic layer 34 may be made of a low-friction material such as copper or PTFE (polytetrafluoroethylene). The non-magnetic layer 34 may be deposited on the inner surface of the cylindrical guide 30 by an application method such as sintering or impregnation, for example. In the exemplary embodiment, the non-magnetic layer 34 is formed by impregnating a copper alloy porous layer formed by sintering with a resin material containing PTFE.

In general, a guide (bearing) for constraining a radial position of a mover and axially guiding the mover is provided at a location separated from a radial magnetic gap between a yoke and the mover. In this case, if the axis of the yoke is eccentric with respect to the guide for regulating the radial position of the mover, the magnetic gap between the mover and the yoke on an outer peripheral side of the mover is also affected by the eccentricity. Therefore, it is necessary to secure a relatively wide magnetic gap between the mover and the yoke on the outer peripheral side of the mover, taking into account the influence of misalignment of the yoke with respect to the guide (bearing).

In this respect, as in the embodiments shown in FIGS. 2 to 5, if the cylindrical guide 30, which is capable of realizing the guide function for axially guiding the mover 50 by the non-magnetic layer 34, is fixed to the inner peripheral side of the first yoke 14, it is possible to substantially eliminate the influence of the misalignment of the first yoke 14 with respect to the cylindrical guide 30. Therefore, a radial clearance tr to be secured between the cylindrical guide 30 and the mover 50 is sufficient to have a size that allows for assembly of the mover 50. As a result, a magnetic gap between the first stator 10 and the mover 50 can be reduced, and the magnetic flux from the first stator 10 toward the mover 50 can be increased.

The magnetic gap between the first stator 10 and the mover 50 in this case is the sum of the above-described radial clearance tr and the thickness of the non-magnetic layer 34.

As shown in FIG. 2, a minimum distance d1 between the magnetic tube 32 of the cylindrical guide 30 and the second stator 20 (second press part 40) is greater than a minimum distance d2 between the mover 50 at the original position and the second stator 20 (second press part 40).

In the exemplary embodiment shown in FIG. 2, the annular projection 100 of the mover 50 at the original position extends toward the second stator 20 beyond the axial position of the distal end 31 of the cylindrical guide 30 (magnetic tube 32), establishing the relation of d1>d2.

By thus satisfying the relation of d1>d2, a magnetic resistance in the gap between the magnetic tube 32 and the second stator 20 becomes greater than a magnetic resistance in the gap between the second stator 20 and the mover 50 at the original position. As a result, it is possible to increase the magnetic flux flowing between the second stator 20 and the mover 50 at the original position.

Thus, it is possible to effectively transfer the magnetism between the mover 50 at the original position and the first stator 10 and the second stator 20, and it is possible to realize the compact and high-thrust solenoid actuator 1.

In some embodiments, as shown in FIG. 2, the cylindrical guide 30 axially extends toward the second stator 20 beyond a distal end position X_yoke of the first yoke 14. The minimum distance d1 between the magnetic tube 32 of the cylindrical guide 30 and the second stator 20 (second press part 40) may be less than a minimum distance d3 between the first yoke 14 and the second stator 20 (second press part 40).

By extending the cylindrical guide 30 toward the second stator 20 beyond the distal end position X_yoke of the first yoke 14, it becomes easier to secure the magnetism transfer area between the mover 50 and the magnetic tube 32 of the cylindrical guide 30, and it is possible to increase the magnetic flux flowing between the second stator 20 and the mover 50 at the original position.

Meanwhile, if the distal end of the cylindrical guide 30 is brought too close to the second stator 20, the magnetic flux flowing between the magnetic tube 32 and the second stator 20 without via the mover 50 increases, which may result in a decrease in magnetic flux between the mover 50 and the second stator 20. In this respect, by imposing the restriction on the distal end position of the cylindrical guide 30 (magnetic tube 32) so as to satisfy the above-described relation of d1>d2, it is possible to sufficiently secure the magnetic flux flowing between the mover 50 at the original position and the second stator 20.

The first yoke 14 of the first stator 10 is formed by a magnetic material that may be, for example, iron and is disposed so as to surround the coil 3. The first yoke 14 may contact the second stator 20 at the contact section 12 on the outer peripheral side of the coil 3.

The first yoke 14 has the first through hole 15 for receiving the cylindrical guide 30. The first through hole 15 may be a circular hole concentric with the central axis O of the solenoid actuator 1.

As shown in FIG. 1, the inner wall of the first through hole 15 of the first yoke 14 includes a contact region 15*a* which is in contact with an outer peripheral surface of the cylindrical guide 30 and a non-contact region 15b which is not in contact with the outer peripheral surface of the cylindrical guide 30. The non-contact region 15b is adjacent to the contact region 15a in the axial direction. The non-contact region 15b is located opposite to the second stator 20 across the contact region 15a in the axial direction.

In some embodiments, as shown in FIG. 1, an inner diameter of the first through hole 15 is the same between the contact region 15a and the non-contact region 15b. In another embodiment, the inner diameter of the first through hole 15 is larger in the non-contact region 15b than in the contact region 15a. In either case, the inner wall of the first through hole 15 is not provided with a step that restricts the axial position of the cylindrical guide 30 with respect to the first yoke 14.

Thus, the step of the inner wall of the first through hole 15 does not hinder the axial positioning of the cylindrical guide 30 with respect to the second stator 20. Accordingly, when assembling the cylindrical guide 30 to the first yoke 14, it is possible to appropriately adjust the axial position of the distal end 31 of the cylindrical guide 30 and it becomes easier to control the air gap 11 with high accuracy.

In some embodiments, as shown in FIGS. 1 to 5, the second stator 20 includes a second yoke 24 and the second press part 40 fixed to an inner peripheral side of the second yoke 24.

The second yoke 24 is formed by a magnetic material that may be, for example, iron and is disposed so as to surround the coil 3. The second yoke 24 may be formed by a press part. The second yoke 24 may contact the first stator 10 (first yoke 14) at the contact section 12 on the outer peripheral side of the coil 3.

In the embodiments shown in FIGS. 1 to 5, the second yoke 24 has a second through hole 25 for at least partially receiving the second press part 40. The second through hole 25 may be a circular hole concentric with the central axis O of the solenoid actuator 1.

In some embodiments, as shown in FIGS. 1 and 2, the second yoke 24 decreases in thickness t toward the air gap 11. That is, the second yoke 24 has a tapered section 26 with the thickness t (see FIG. 1) decreasing toward the air gap 11, in a distal end region on the air gap 11 side. The tapered section 26 forms an inner peripheral section of the second yoke 24.

Herein, the thickness t of the second yoke 24 is the radial dimension of the second yoke 24.

As shown in FIGS. 1 to 3 and 5, the tapered section 26 of the second yoke 24 may be disposed radially adjacent to a rim section 42 of the second press part 40, which will be described later.

The second press part 40 is a press-molded product made of a magnetic material that may be, for example, iron.

In some embodiments, the second press part 40 at least partially forms the annular recess 120 disposed so as to face the annular projection 100 of the mover 50 in the axial direction. The annular recess 120 is disposed continuously in the circumferential direction at a radial position corresponding to the annular projection 100. As shown in FIGS. 1 and 2, the annular projection 100 of the mover 50 at the original position (X=0) does not enter the annular recess 120. On the other hand, as shown in FIGS. 3 to 5, the annular projection 100 of the mover 50 at the maximum stroke position (X=Xmax) at least partially enters the annular recess 120. That is, the annular recess 120 of the second press part 40 has a shape capable of receiving the annular projection 100 of the mover 50 at the maximum stroke position.

The shape of the annular recess 120 is not particularly limited, but the annular recess 120 may have a complementary shape to the annular projection 100 as shown in FIGS. 1 to 5 from the viewpoint of forming an appropriate magnetic flux between the annular projection 100 and the annular recess 120 in the vicinity of the maximum stroke position of the mover 50.

In the embodiments shown in FIGS. 1 to 5, the second press part 40 has a facing surface 45 facing the inner peripheral surface 110 of the annular projection 100 entering the annular recess 120 at the maximum stroke position (X=Xmax). The facing surface 45 defines a boundary on a radially inner side of the annular recess 120. The facing surface 45 may extend along the inner peripheral surface 110 so as to form a gap of substantially constant size with the inner peripheral surface 110 of the annular projection 100.

In the examples shown in FIGS. 1 to 4, the inner peripheral surface 110 of the annular projection 100 has the tapered shape increasing in diameter toward the distal end of the annular projection 100, and the facing surface 45 of the second press part 40 has a tapered shape decreasing in diameter toward the mover 50 in the axial direction. The tapered inner peripheral surface 110 and the tapered facing surface 45 may be parallel to each other.

In the embodiments shown in FIGS. 1 to 3 and 5, the annular recess 120 is formed by the second press part 40 including the rim section 42 and a ridge section 44.

The rim section 42 is located on an outermost peripheral side of the second press part 40 and axially extends from the bottom of the annular recess 120 toward the first stator 10. The rim section 42 is disposed continuously in the circumferential direction on the inner peripheral side of the tapered section 26 of the second yoke 24 and defines a boundary on a radially outer side of the annular recess 120. The ridge section 44 is located on an inner peripheral side of the rim section 42 and is ridged from the bottom of the annular recess 120 toward the mover 50. The ridge section 44 is disposed continuously in the circumferential direction and defines the boundary on the radially inner side of the annular recess 120. The above-described facing surface 45 may be formed by the ridge section 44.

The annular recess 120 is defined by the rim section 42 and the ridge section 44.

In some embodiments, the first stator 10 and the rim section 42 of the second press part 40 are arranged to face each other with the air gap 11 therebetween in the axial direction. Specifically, as shown in FIGS. 1 to 3 and 5, the rim section 42 may be disposed at a radial position where it at least partially overlaps the cylindrical guide 30 of the first stator 10, and the air gap 11 may be formed between the distal end 31 of the cylindrical guide 30 and the distal end portion 21 of the rim section 42.

In order to form the air gap 11 between the distal end 31 of the cylindrical guide 30 and the distal end portion 21 of the rim section 42, the rim section 42 of the second press part 40 may extend over a wider axial range than the ridge section 44. That is, a ridge height of the ridge section 44 from the bottom of the annular recess 120 may be less than an extension height of the rim section 42 from the bottom of the annular recess 120.

In some other embodiments, as shown in FIG. 4, the annular recess 120 is formed by the tapered section 26 of the second yoke 24 and the second press part 40 including the ridge section 44.

The tapered section 26 of the second yoke 24 at least partially defines the boundary on the radially outer side of the annular recess 120. On the other hand, the ridge section 44 of the second press part 40 is disposed continuously in the circumferential direction on the inner peripheral side of the tapered section 26 and defines the boundary on the radially inner side of the annular recess 120.

In the embodiment shown in FIG. 4, the air gap 11 is formed between the distal end 31 of the cylindrical guide 30 and the tapered section 26 of the second yoke 24. As such, the tapered section 26 of the second yoke 24 extends over the wider axial range than the ridge section 44. That is, the distal end portion 21 of the tapered section 26 of the second yoke 24 is located closer to the first stator 10 than a terminal portion of the ridge section 44 of the second press part 40 in the axial direction.

In some embodiments, as shown in FIGS. 1 to 5, the second press part 40 includes a disk section 46 extending radially inward from the ridge section 44 and an inner cylinder section 48 axially extending from an inner peripheral edge of the disk section 46 in a direction away from the mover 50.

The inner cylinder section 48 may function as the above-described bearing section 53 for slidably supporting the shaft 54.

The disk section 46 extends along the radial direction so as to face the axial end surface 56 of the mover 50 located on the inner peripheral side of the annular projection 100 in the axial direction.

As shown in FIGS. 3 to 5, the axial projection length of the annular projection 100 from the axial end surface 56 is set greater than an axial range occupied by the ridge section 44. As a result, an axial distance between the axial end surface 56 of the mover 50 and the disk section 46 of the second press part 40 is greater than the axial distance between the distal end of the annular projection 100 and the bottom of the annular recess 120, at the maximum stroke position of the mover 50.

In some embodiments, as shown in FIGS. 1 to 5, the inner cylinder section 48 (bearing section 53) of the second press part 40 extends from the inner peripheral edge of the disk section 46 to an axial position of an outer end surface 22 of the second yoke 24. That is, an axial end 49 of the inner cylinder section 48 (bearing section 53) of the second press part 40, which is disposed opposite to the disk section 46, coincides with the axial position of the outer end surface 22 of the second yoke 24.

In some embodiments described above, the annular projection 100 of the mover 50 at the maximum stroke position (X=Xmax) is received in the annular recess 120 of the second stator 20. Therefore, compared to a solenoid actuator without the annular projection 100 and the annular recess 120, the magnetism transfer area between the mover 50 and the second stator 20 increases (see the magnetic flux distribution in FIG. 3) in the facing region of the annular projection 100 and the annular recess 120, making it possible to suppress the decrease in thrust applied to the mover 50 in the vicinity of the maximum stroke position. As a result, it is possible to realize a flat attraction characteristic with small fluctuations in thrust over the entire stroke range.

This will be described with reference to FIGS. 7A to 7C, 8A to 8C, and 9.

Figure 7A:
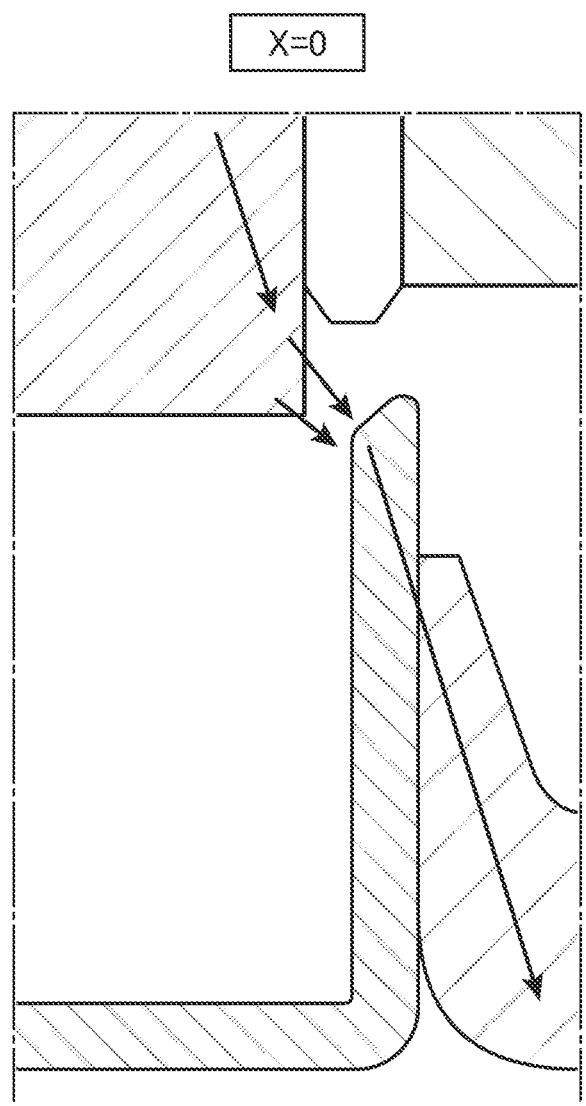
FIG. 7A is a schematic view showing a magnetic flux distribution of the solenoid actuator according to a comparative example when the mover is at the original position.
Figure 7B:
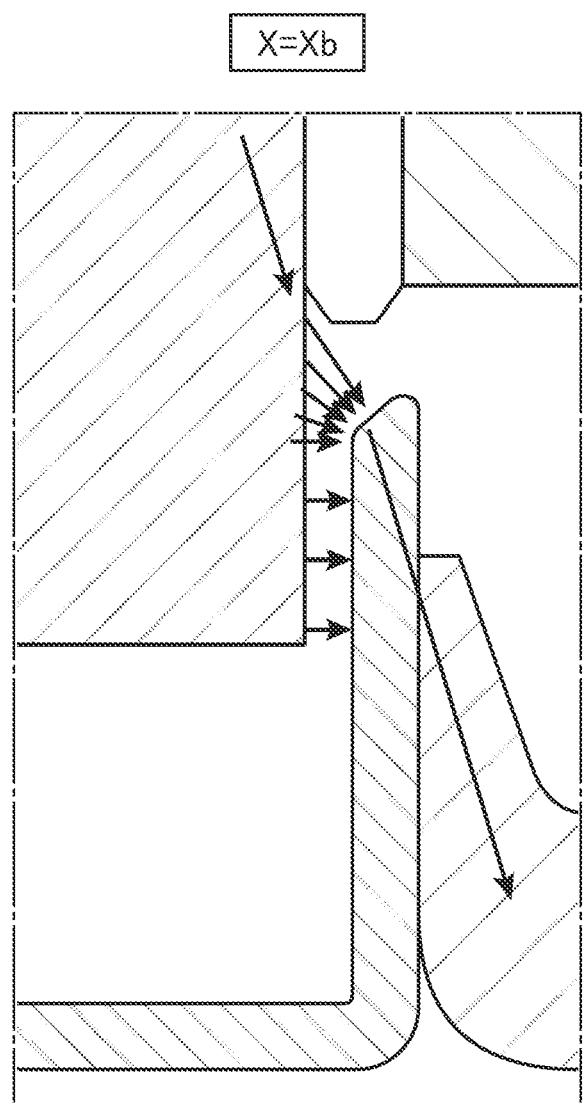
FIG. 7B is a schematic view showing a magnetic flux distribution of the solenoid actuator according to the comparative example when the mover is at an intermediate position.
Figure 7C:
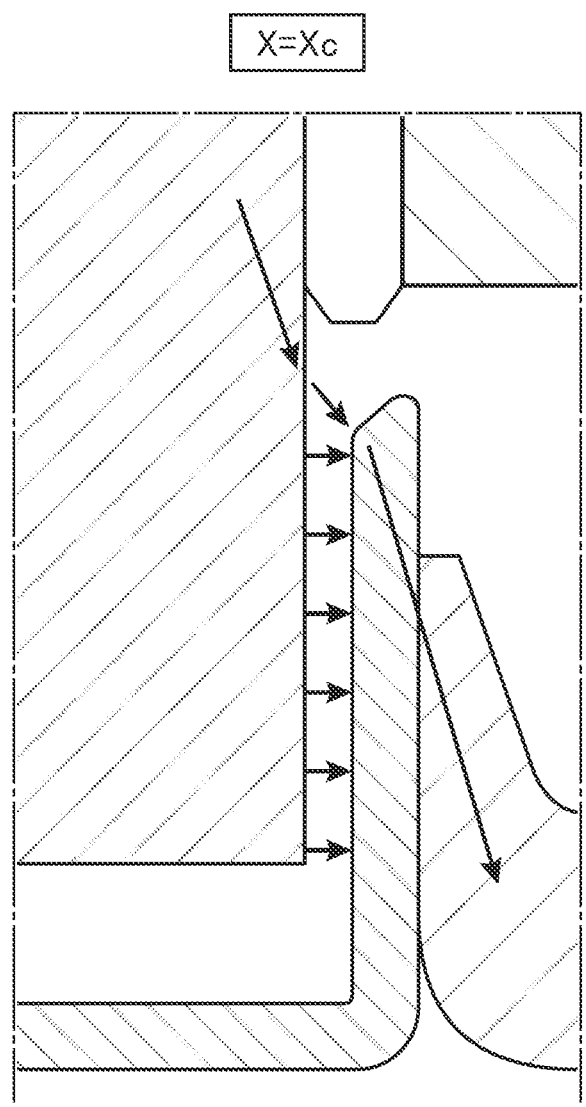
FIG. 7C is a schematic view showing a magnetic flux distribution of the solenoid actuator according to the comparative example when the mover is in the vicinity of the maximum stroke position.
Figure 8A:
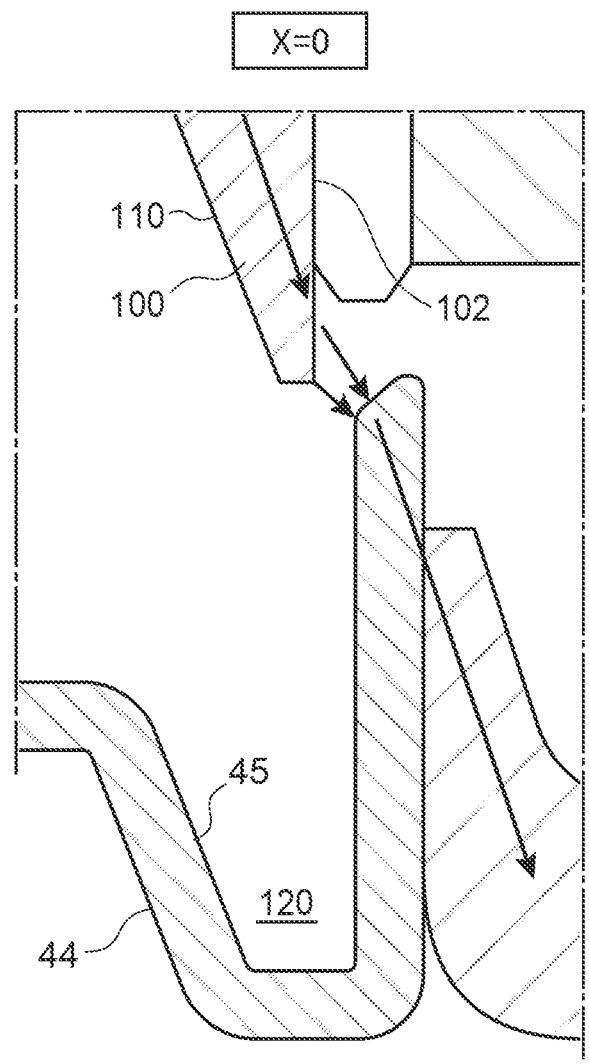
FIG. 8A is a schematic view showing a magnetic flux distribution of the solenoid actuator according to an embodiment when the mover is at the original position.
Figure 8B:
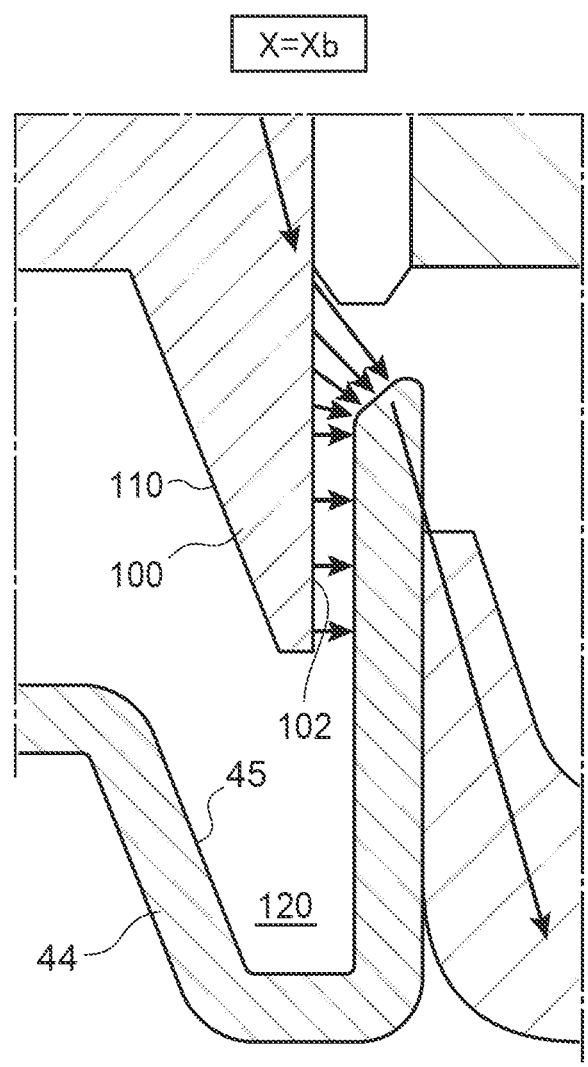
FIG. 8B is a schematic view showing a magnetic flux distribution of the solenoid actuator according to an embodiment when the mover is at the intermediate position.
Figure 8C:
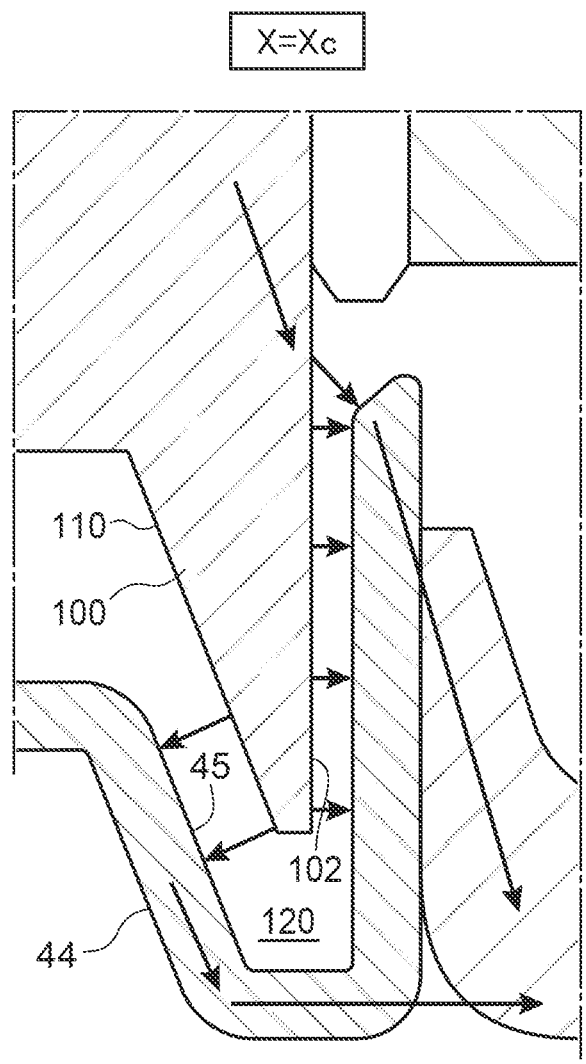
FIG. 8C is a schematic view showing a magnetic flux distribution of the solenoid actuator according to an embodiment when the mover is in the vicinity of the maximum stroke position.

FIGS. 7A to 7C are each a schematic view showing a change in magnetic flux distribution as the stroke amount of the solenoid actuator increases according to a comparative example. FIGS. 8A to 8C are each a schematic view showing a change in magnetic flux distribution as the stroke amount of the solenoid actuator 1 increases according to the embodiment of the present invention.

Figure 9:
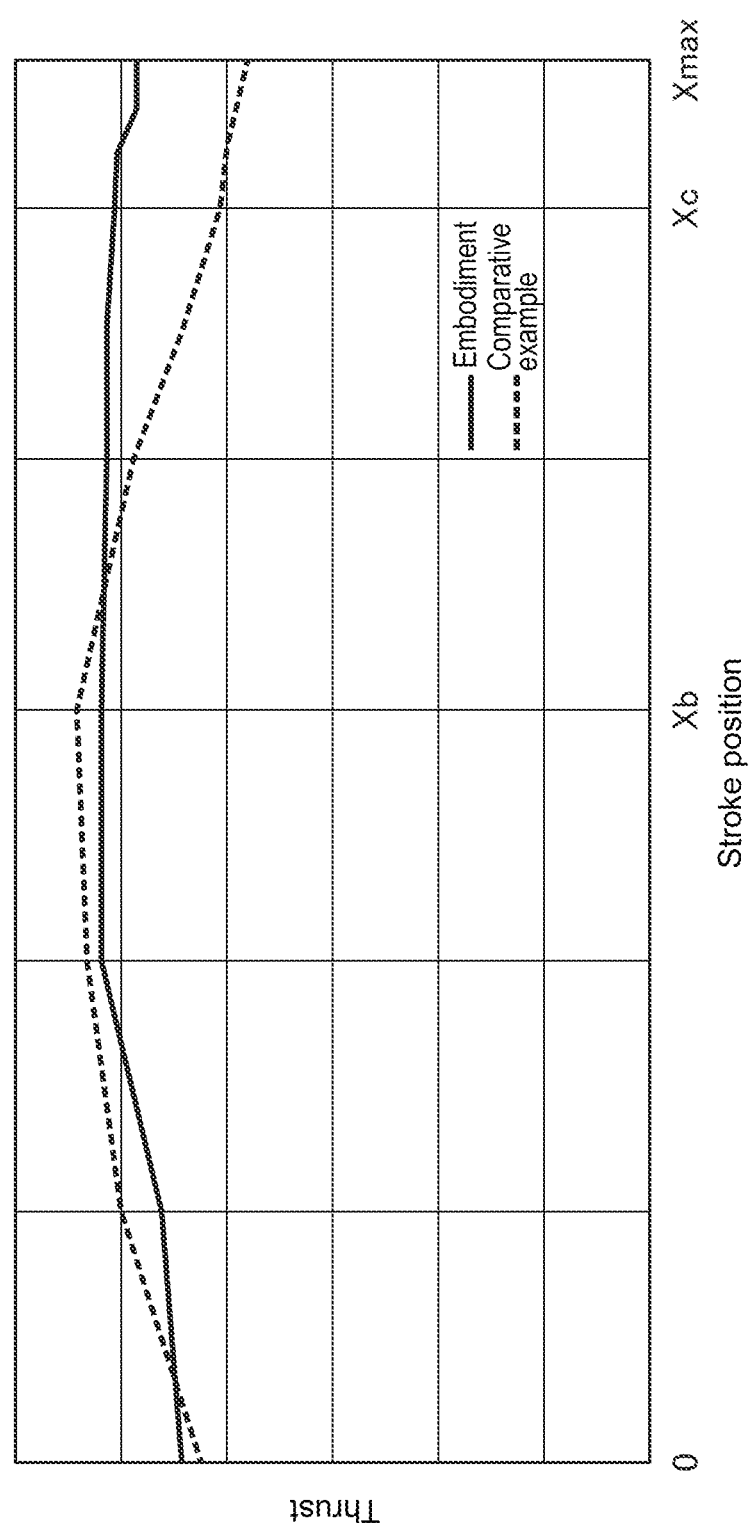
FIG. 9 is a graph showing attraction characteristics of the solenoid actuators of the embodiment and the comparative example.

FIGS. 7A and 8A show a state where the mover 50 is at the original position (X=0 in FIG. 9), FIGS. 7B and 8B show a state where the mover 50 is at an intermediate position (X=Xb in FIG. 9), and FIGS. 7C and 8C show a state where the mover 50 is in the vicinity of the maximum stroke position (X=Xc in FIG. 9).

FIG. 9 is a graph showing attraction characteristics of the solenoid actuators of the embodiment of the present invention and the comparative example.

The "comparative example" shown in FIGS. 7A to 7C and 9 means the solenoid actuator without the annular projection 100 and the annular recess 120.

As shown in FIG. 7A, the axial component of the magnetic flux generated between the mover and the second stator is relatively large when the mover is at the original position (X=0). Therefore, it is possible to secure the thrust of the solenoid actuator to some extent (see FIG. 9).

As shown in FIG. 7B, the magnetic flux generated between the mover and the second stator increases if the mover moves to the intermediate position (X=Xb). Therefore, the thrust of the solenoid actuator increases (see FIG. 9).

However, as shown in FIG. 7C, if the mover further moves to the vicinity of the maximum stroke position (X=Xc) beyond the intermediate position, the magnetic flux as a whole does not increase any further due to magnetic saturation in the second stator. Meanwhile, the magnetic flux concentrates in a region having the smaller gap between the mover and the second stator. As a result, the proportion of the magnetic flux with a large axial component decreases, and the proportion of the radial component of the magnetic force acting between the mover and the second stator increases toward the maximum stroke position. Therefore, the thrust applied to the mover decreases from before the maximum stroke position to the maximum stroke position (see FIG. 9).

On the other hand, in the solenoid actuator 1 according to the embodiment, the thrust does not significantly decrease until the vicinity of the maximum stroke position, as shown in FIG. 9.

Also in the case of the solenoid actuator 1, as shown in FIGS. 8A and 8B, the change in magnetic flux distribution of the solenoid actuator 1 during the process in which the mover moves from the original position to the intermediate position is the same as in the comparative example (FIGS. 7A and 7B). However, as shown in FIG. 8C, when the mover reaches the vicinity of the maximum stroke position (X=Xc), the annular projection 100 of the mover 50 enters into the annular recess 120 of the second stator 20, and a magnetic flux starts to be formed between the inner peripheral surface 110 of the annular projection 100 and the ridge section 44 of the second press part 40. That is, since the annular projection 100 enters into the annular recess 120 in the vicinity of the maximum stroke position, the magnetic flux is also transferred between the inner peripheral surface 110 of the annular projection 100 and the facing surface 45 of the annular recess 120, improving the magnetic flux transfer area. As a result, the force to attract the mover 50 toward the second stator 20 increases in the vicinity of the maximum stroke position, and the decrease in thrust of the solenoid actuator 1 is suppressed (see FIG. 9).

A specific structural example of the solenoid actuator 1 described above will be described with reference to FIG. 10.

Figure 10:
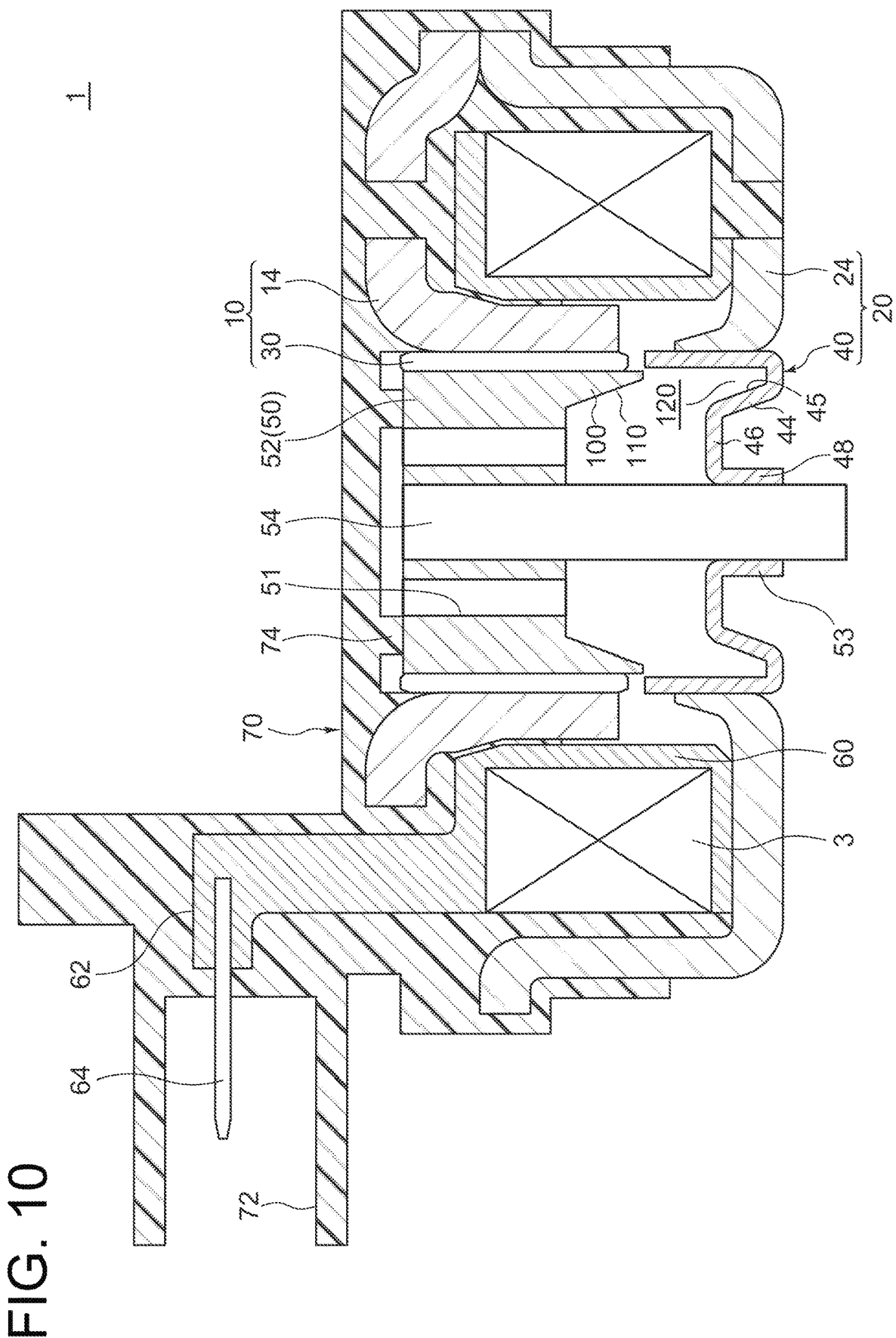
FIG. 10 is a cross-sectional view showing the solenoid actuator according to an embodiment.

FIG. 10 is a cross-sectional view showing the solenoid actuator according to an embodiment.

As shown in FIG. 10, the solenoid actuator 1 includes the coil 3, the first stator 10 and the second stator 20, and the mover 50 (plunger 52). The first stator 10, the second stator 20, and the mover 50 have the configurations described with reference to FIGS. 1 to 3.

The coil 3 is formed by winding a wire made of a conductor such as copper or copper alloy around a bobbin 60. The bobbin 60 is substantially surrounded by the first stator 10 and the second stator 20. However, the first stator 10 (first yoke 14) is provided with a notch in a partial circumferential range, and a terminal holding portion 62 of the bobbin 60 is exposed in the notch of the first yoke 14. The terminal holding portion 62 of the bobbin 60 is embedded with a proximal end portion of a terminal 64. The terminal 64 is electrically connected to the wire, which constitutes the coil 3, in the bobbin 60.

Further, in the solenoid actuator 1, the coil 3 and the bobbin 60, and the first stator 10 and the second stator 20 are integrally molded in a resin mold 70 and embedded in the resin mold 70. The terminal 64 penetrates the resin mold 70 from the terminal holding portion 62 of the bobbin 60, projects into a recess 72 disposed in the resin mold 70, and can electrically be connected to an external terminal fitted into the recess 72.

The resin mold 70 has a projection 74 that contacts a rear end of the mover 50 (plunger 52) located at the original position.

The characteristic configurations of the solenoid actuator 1 according to some embodiments described above are summarized as follows.

[1] A solenoid actuator (1) according to at least some embodiments of the present invention, includes: a coil (3); a first stator (10) and a second stator (20) disposed with an air gap (11) therebetween in an axial direction so as to form a magnetic path (4) around the coil (3); and a mover (50) configured to be movable in the axial direction to a maximum stroke position (X=Xmax) from an original position (X=0) on a radially inner side of the first stator (10) toward the second stator (20) by a magnetic force generated by energizing the coil (3). The mover (50) has an annular projection (100) projecting in the axial direction from a peripheral edge portion of the mover (50). The second stator (20) includes: a second yoke (24); and a second press part (40) made of a magnetic material and disposed on an inner peripheral side of the second yoke (24) so as to at least partially form an annular recess (120) for receiving the annular projection (100) of the mover (50) at the maximum stroke position (X=Xmax).

With the above configuration [1], since the annular projection (100) of the mover (50) at the maximum stroke position is received in the annular recess (120) of the second stator (20), the magnetism transfer area between the mover (50) and the second stator (20) increases in the vicinity of the maximum stroke position, making it possible to suppress the decrease in thrust applied to the mover (50). As a result, it is possible to realize a flat attraction characteristic with small fluctuations in thrust over the entire stroke range.

Further, since the annular recess (120) of the second stator (20) is at least partially formed by the second press part (40), the manufacturing cost can be reduced as compared with the case where the second stator (20) with the annular recess (120) is formed by a one-piece machined product.

[2] In some embodiments, in the above configuration [1], the annular projection (100) of the mover (50) has a tapered inner peripheral surface (110) increasing in diameter toward a distal end of the annular projection (100), the second press part (40) has a facing surface (45) facing the inner peripheral surface (110) of the annular projection (100) entering the annular recess (120) at the maximum stroke position (X=Xmax), and the facing surface (45) of the second press part (40) defines a boundary on a radially inner side of the annular recess (120) and has a tapered shape decreasing in diameter toward the mover (50) in the axial direction.

With the above configuration [2], the inner peripheral surface (110) of the annular projection (100) and the facing surface (45) of the annular recess (120) extend obliquely with respect to the axial direction. Therefore, in a region with a small stroke amount near the original position (X=0), the inner peripheral surface (110) of the annular projection (100) is sufficiently away from the facing surface (45) of the annular recess (120) as shown in FIGS. 8A and 8B, making it possible to avoid a situation where excessive thrust is applied to the mover (50). On the other hand, when the annular projection (100) enters the annular recess (120) in the vicinity of the maximum stroke position (X=Xmax), the magnetic flux is formed between the inner peripheral surface (110) of the annular projection (100) and the facing surface (45) of the annular recess (120) as shown in FIG. 8. Herein, since the inner peripheral surface (110) and the facing surface (45) extend obliquely with respect to the axial direction, the magnetic flux between the peripheral surface (110) and the facing surface (45), which additionally occurs at the time the mover (50) reaches the vicinity of the maximum stroke position, has a relatively large axial component. Therefore, it is possible to more effectively suppress the decrease in thrust applied to the mover in the vicinity of the maximum stroke position.

[3] In some embodiments, in the above configuration [2], a relation of $\theta\_taper \geq 0.75 \times \theta\_ref$ is satisfied, where $\theta\_ref$ is an angle formed by the inner peripheral surface (110) of the annular projection (100) with respect to an outer peripheral surface (102) of the annular projection (100) and $\theta\_taper$ is an angle formed by the inner peripheral surface (110) of the annular projection (100) with respect to the axial direction.

From the viewpoint of compactness of the solenoid actuator (1), it is desirable to limit the formation range of the annular projection (100) in the radial direction.

In this respect, as in [2] above, if $\theta\_taper \geq 0.75 \times \theta\_ref$ is established, a sufficient taper angle of the inner peripheral surface (110) of the annular projection (100) can be ensured to realize the flat attraction characteristic over the entire stroke range, while satisfying the restriction of the formation range of the annular projection (100) in the radial direction.

As shown in FIGS. 1 to 5, if the mover (50) has the communication hole (51), it is necessary to provide the annular projection (100) at a position avoiding the communication hole (51). In this respect, since the annular projection (100) satisfies the relation of $\theta\_taper \geq 0.75 \times \theta\_ref$, the annular projection (100) is easily arranged at the position avoiding the communication hole (51) while suppressing an increase in diameter of the mover (50).

[4] In some embodiments, in any of the above configurations [1] to [3], the second press part (40) includes: a rim section (42) located on an outermost peripheral side of the second press part (40) and extending in the axial direction from a bottom of the annular recess (120) toward the first stator (10); and a ridge section (44) located on an inner peripheral side of the rim section (42) and ridged from the bottom of the annular recess (120) toward the mover (50) so as to define the annular recess (120) together with the rim section (42).

With the above configuration [4], the shape of the annular recess (120) capable of applying appropriate thrust to the mover (50) in the vicinity of the maximum stroke position can be realized by the second press part (4). Whereby, the manufacturing cost can be reduced as compared with the case where the second stator (20) with the annular recess (120) is formed by a one-piece machined product.

[5] In some embodiments, in the above configuration [4], the first stator (10) and the rim section (42) of the second press part (40) are arranged to face each other with the air gap (11) therebetween in the axial direction.

The air gap (11) between the first stator (10) and the second stator (20) greatly affects the thrust of the mover (50) in the region with the small stroke amount near the original position.

In this respect, the thrust of the mover (50) in the region with the small stroke amount near the original position can be controlled by the shape of the rim section (42) of the second press part (40), and the thrust of the mover (50) near the maximum stroke position can be controlled by the shape of the ridge section (44) of the second press part (40). Thus, by devising the shape of the second press part (40) of the second stator (20), it is possible to achieve the flat attraction characteristic over the entire stroke range while reducing the cost.

[6] In some embodiments, in the above configuration [4], the first stator (10) includes: a first yoke (14); and a cylindrical guide (30) fixed to an inner peripheral side of the first yoke (14) and forming the air gap (11) with the rim section (42) of the second press part (40).

With the above configuration [6], since the air gap (11) is formed between the cylindrical guide (30) disposed separately from the first yoke (14) and the second press part (40) disposed separately from the second yoke (24), the air gap (11) can be controlled with high accuracy.

Further, since the cylindrical guide (30) capable of realizing the guide function for axially guiding the mover (50) is fixed to the inner peripheral side of the first yoke (14), it is possible to substantially eliminate the influence of misalignment of the first yoke (14) with respect to the cylindrical guide (30). Therefore, the radial clearance (tr) to be secured between the cylindrical guide (30) and the mover (50) is sufficient to have the size that allows for assembly of the mover (50). As a result, the magnetic gap between the first stator (10) and the mover (50) can be reduced, and the magnetic flux from the first stator (10) toward the mover (50) can be increased.

[7] In some embodiments, in the above configuration [4], a ridge height of the ridge section (44) from the bottom of the annular recess (120) is less than an extension height of the rim section (42) from the bottom of the annular recess (120).

With the above configuration [7], since the height of the ridge section (44) of the second press part (40) is set less than the height of the rim section (42), the distance between the inner peripheral surface (110) of the annular projection (100) and the ridge section (44) of the second press part (40) is sufficiently secured in the region with the small stroke amount near the original position, making it possible to avoid the situation where excessive thrust is applied to the mover (50). On the other hand, when the annular projection (100) enters the annular recess (120) in the vicinity of the maximum stroke position, the decrease in thrust applied to the mover (50) in the vicinity of the maximum stroke position can be suppressed by the magnetic force acting between the inner peripheral surface (110) of the annular projection (100) and the ridge section (44) of the second press part (40). As a result, it is possible to realize the flat attraction characteristic with small fluctuations in thrust over the entire stroke range.

[8] In some embodiments, in the above configuration [4], the mover (50) includes: a plunger (52); and a shaft (54) connected to the plunger (52), and the second press part (40) includes: a disk section (46) extending radially inward from the ridge section (44); and a bearing section (53; inner cylinder section 48) extending in the axial direction from an inner peripheral edge of the disk section (46) in a direction away from the mover (50) and configured to slidably support the shaft (54).

With the above configuration [8], since the bearing section (53) and the annular recess (120) are formed by the second press part (40), it is possible to achieve both supporting the shaft (54) of the mover (50) and realizing the flat attraction characteristic while reducing the number of parts. Further, since the disk section (46) extends radially inward, the connection position of the disk section (46) and the bearing section (53; inner cylinder section 48) can approximately coincide with the axial position of the upper end portion of the ridge section (44). Therefore, the length (bearing area) of the bearing section (53) can be ensured while suppressing an increase in axial dimension of the solenoid actuator (1).

[9] In some embodiments, in the above configuration [7], the bearing section (53) of the second press part (40) extends from the inner peripheral edge of the disk section (46) to an axial position of an outer end surface (22) of the second yoke (24).

With the above configuration [9], since the bearing section (53) of the second press part (40) terminates at the axial position of the outer end surface (22) of the second yoke (24), it is possible to achieve both reducing the axial dimension of the solenoid actuator (1) and securing the bearing area of the bearing section (53).

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

The invention claimed is:

1. A solenoid actuator, comprising:
a coil;
a first stator and a second stator disposed with an air gap therebetween in an axial direction so as to form a magnetic path around the coil; and
a mover configured to be movable in the axial direction to a maximum stroke position from an original position on a radially inner side of the first stator toward the second stator by a magnetic force generated by energizing the coil,
the mover having an annular projection projecting in the axial direction from a peripheral edge portion of the mover, the second stator including:
- a second yoke; and
- a second press part made of a magnetic material and disposed on an inner peripheral side of the second yoke so as to at least partially form an annular recess for receiving the annular projection of the mover at the maximum stroke position, and the second press part including:
- a rim section located on an outermost peripheral side of the second press part and extending in the axial direction from a bottom of the annular recess toward the first stator; and
- a ridge section located on an inner peripheral side of the rim section and ridged from the bottom of the annular recess toward the mover so as to define the annular recess together with the rim section.

2. The solenoid actuator according to claim 1,
wherein the annular projection of the mover has a tapered inner peripheral surface increasing in diameter toward a distal end of the annular projection,
the second press part has a facing surface facing the inner peripheral surface of the annular projection entering the annular recess at the maximum stroke position, and
the facing surface of the second press part defines a boundary on a radially inner side of the annular recess and has a tapered shape decreasing in diameter toward the mover in the axial direction.

3. The solenoid actuator according to claim 2,
wherein a relation of $\theta\_taper \geq 0.75 \times \theta\_ref$ is satisfied, where $\theta\_ref$ is an angle formed by the inner peripheral surface of the annular projection with respect to an outer peripheral surface of the annular projection and $\theta\_taper$ is an angle formed by the inner peripheral surface of the annular projection with respect to the axial direction.

4. The solenoid actuator according to claim 1,
wherein the first stator and the rim section of the second press part are arranged to face each other with the air gap therebetween in the axial direction.

5. The solenoid actuator according to claim 1,
wherein the first stator includes:
- a first yoke; and
- a cylindrical guide fixed to an inner peripheral side of the first yoke and forming the air gap with the rim section of the second press part.

6. The solenoid actuator according to claim 1,
wherein a ridge height of the ridge section from the bottom of the annular recess is less than an extension height of the rim section from the bottom of the annular recess.

7. The solenoid actuator according to claim 1,
wherein the mover includes:
- a plunger; and
- a shaft connected to the plunger, and the second press part includes:
- a disk section extending radially inward from the ridge section; and
- a bearing section extending in the axial direction from an inner peripheral edge of the disk section in a direction away from the mover and configured to slidably support the shaft.

8. The solenoid actuator according to claim 7,
wherein the bearing section of the second press part extends from the inner peripheral edge of the disk section to an axial position of an outer end surface of the second yoke.

* * * * *